United States Patent [19]

Buma

[11] Patent Number: 4,690,430
[45] Date of Patent: Sep. 1, 1987

[54] AIR SUSPENSION

[75] Inventor: Shuuichi Buma, Toyota, Japan

[73] Assignee: Toyota Jidosha Kabushiki Kaisha, Toyota, Japan

[21] Appl. No.: 829,313

[22] Filed: Feb. 14, 1986

[30] Foreign Application Priority Data

Feb. 14, 1985 [JP] Japan .............................. 60-18333[U]

[51] Int. Cl.[4] ............................................. B60G 11/26
[52] U.S. Cl. ................................ 280/708; 267/64.21;
277/180; 280/711; 280/6 R
[58] Field of Search .............. 280/708, 711, 6 R, 702,
280/703; 267/64.21; 277/180

[56]        References Cited
       U.S. PATENT DOCUMENTS

| 3,000,624 | 9/1961 | Cislo ................................ 267/64.21 |
| 3,074,709 | 1/1963 | Ballard et al. ..................... 267/64.21 |
| 3,302,953 | 2/1967 | Glasgow .............................. 277/180 |
| 4,105,193 | 8/1978 | Long, Jr. ............................ 267/64 R |

FOREIGN PATENT DOCUMENTS 0000287 10/1979 European Pat. Off. .
57-110515 9/1982 Japan .

OTHER PUBLICATIONS

European Search Report 86 10 1846 Application No: 0193035.

Primary Examiner—John J. Love
Assistant Examiner—Kenneth R. Rice
Attorney, Agent, or Firm—Oblon, Fisher, Spivak, McClelland & Maier

[57]                ABSTRACT

An air suspension assembly provided with an air chamber below a car body surrounding a shock absorber and which includes a housing for forming the air chamber having a support connected with a piston rod of the shock absorber, a spacer disposed between the housing and the car body and a mechanism for securing the housing to the car body. The spacer includes an annular base member and a seal member fixed to the base member and having an axial thickness larger than that of the base member before disposal of the spacer.

5 Claims, 3 Drawing Figures

AIR SUSPENSION

BACKGROUND OF THE INVENTION

1. Field of the Invention

This invention relates to an air suspension assembly.

2. Description of the Prior Art

An air suspension assembly is provided which forms an air chamber surrounding a shock absorber to fill compressed air in the air chamber for constituting an air spring (for example, Japanese Patent Public Disclosure (KOKAI) No. 110515/82). In the air suspension assembly, an air tank for the air chamber is mounted on a piston rod of the shock absorber and the piston rod is connected with a car body through a support including a rubber bushing above the air tank mounting portion. A spacer is interposed between the support and the air tank and can be interchanged with spacers having different thicknesses.

While an air suspension can generally adjust the car height by changing the volume of the air chamber, the spring constant of the air spring is changed in order by changing the volume of the air chamber. In other words, the volume of the air chamber needs to be changed to change the spring constant of the air spring, so that the car height can been changed. In "a strut type air suspension" assembly described in said public disclosure, the spring constant can be changed by changing the spacer while maintaining the car height constant.

The air suspension assembly disclosed in said public disclosure had a limitation in softening the rubber bushing provided in the support since the air tank is connected with the piston rod and thus a load from the air spring in addition to a load from the shock absorber is added to the support.

SUMMARY OF THE INVENTION

An object of the present invention is to provide an air suspension assembly which can separate the load from an air spring from that from a shock absorber so that a rubber bushing provided in a support can be made as soft as possible.

A further object of the present invention is to provide an air suspension assembly capable of changing the spring constant while maintaining the car height constant.

The present invention relates to an air suspension assembly provided with an air chamber surrounding a shock absorber and comprising a housing for forming said air chamber having a support connected with a piston rod of said shock absorber, an annular spacer having a seal member contacting respectively the housing and a car body and disposed between said housing and the car body and means for securing fixedly said housing to the car body.

When the housing is connected with the car body, the spacer having a predetermined thickness is disposed between the housing and the car body. Thus, the car height can be maintained constant while the spring constant of the air spring can be changed.

In traveling of a vehicle, the load from the shock absorber is transmitted to the car body through the support and almost of the load from the air spring to the car body through the housing.

Since the housing is secured fixedly to the car body while being provided with the support for connecting the piston rod of the shock absorber, a rubber bushing can be set as soft as possible to provide a better ride when the rubber bushing is disposed on the support.

By disposing spacers having different thicknesses between the housing and the car body, the volume of the air spring can be changed so as to change the spring constant. As a result, automobiles having different spring constants according to the object of use can be easily provided by only inter changing the spacer.

Since the spacer has the seal member contacting the housing and the car body, the compartment of a vehicle can be prevented from intrusion of water, dust and other foreign substances.

BRIEF DESCRIPTION OF THE DRAWINGS

Other objects and features of the invention will become apparent from the following description of a preferred embodiment of the invention with reference to the accompanying drawings, in which.

DESCRIPTION OF THE PREFERRED EMBODIMENT

Figure 1:
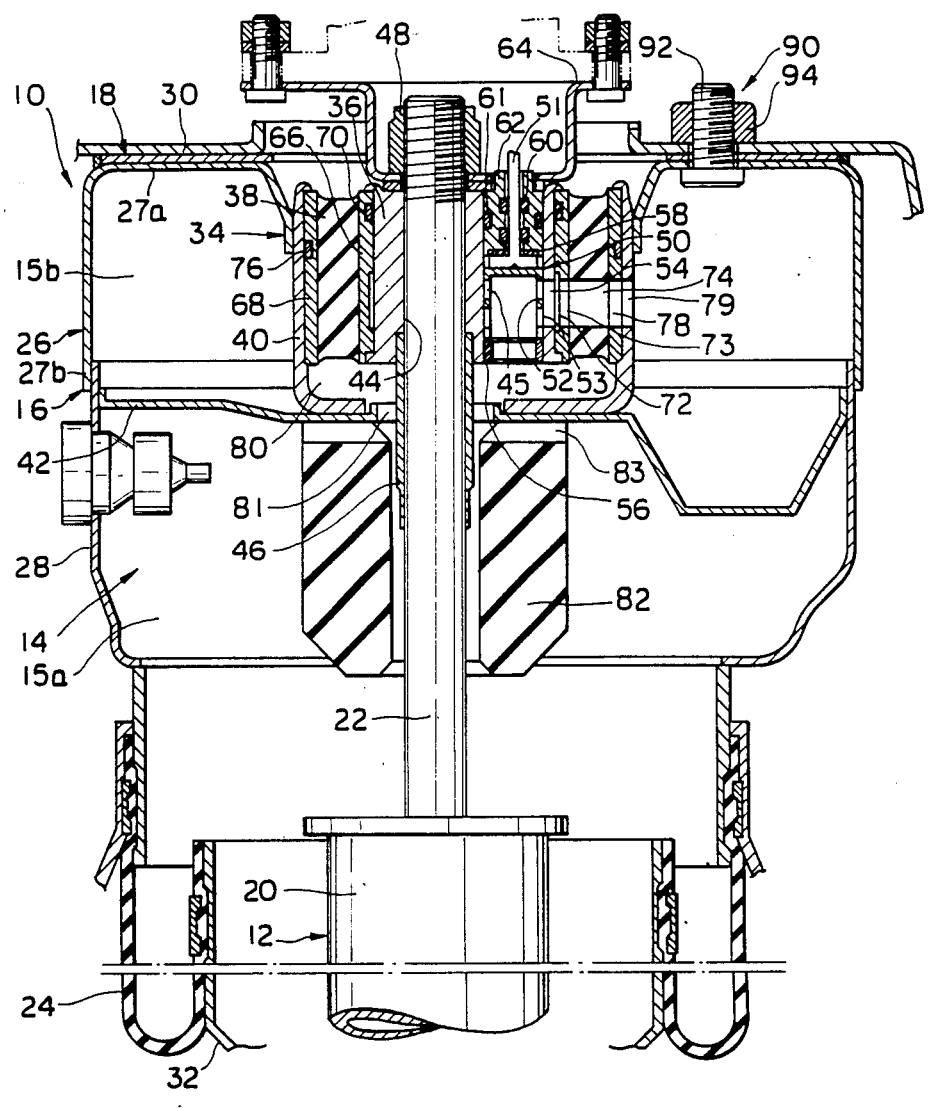
FIG. 1 is a sectional view showing principal parts of an air suspension assembly in accordance with the present invention.

As shown in FIG. 1, an air suspension assembly 10 provided with an air chamber 14 surrounding a shock absorber 12 comprises a housing 16 and a spacer 18.

The shock absorber 12 provided with a cylinder 20, a piston (not shown) and a piston rod 22 is well known per se. A suspension arm (not shown) is connected with the lower end of the cylinder 20 and a support which will be later described is connected with the upper end of the piston rod 22.

The housing 16 forms the air chamber 14 together with a diaphragm 24. In the embodiment shown, the housing 16 consists of a first tubular member 26 and a second tubular member 28, and the top 27a of the first member 26 is disposed opposed to a car body 30. A tubular portion 27b of the first member 26 extends from the top 27a downwardly and fits onto the second tubular member 28 to be welded thereto around the whole circumference so as to provide airtightness. The diaphragm 24 is mounted on both of the second member 28 of the housing and an air piston 32 fixed on the cylinder 20 to define the air chamber 14 surrounding the shock absorber 12. The air chamber 14 is filled with compressed air to constitute an air spring.

The housing 16 is provided with the support 34 connected with the piston rod 22. In the embodiment shown, the support 34 comprises a connecting member 36 made of high rigidity material like iron, a rubber bushing 38 and a tubular member 40 made of high rigidity material. The top 27a of the first member 26 of the housing is welded to the tubular member 40 with airtightness. Further, a partition wall member 42 is welded to the tubular member 40 in a airtight manner. An outer periphery of the partition wall member 42 is welded to the second member 28 of the housing so as to be airtight. As a result, the air chamber 14 is divided into a lower main air chamber 15a and an upper auxiliary air chamber 15b.

The connecting member 36 has a hole 44 through which the piston rod 22 extends and a hole 45 into which a valve body is inserted. The piston rod 22 extends through the hole 44, and the connecting member 36 is sandwiched between a holder 46 secured to the piston rod 22 and a nut 48 screwed onto the piston rod 22 so that the piston rod 22 is secured to the connecting member 36.

A valve body 50 is rotatably disposed in the hole 45 of the connecting member 36. In the embodiment shown, since the air chamber 14 consists of the main air chamber 15a and the auxiliary air chamber 15b, communication between both air chambers is afforded or interrupted by the valve body 50. The valve body 50 has a bored hole 52 opened to a lower end and a hole 53 extending from the bored hole 52 diametrally. As will be later described, when the valve body 50 is disposed in a predetermined position, an operating portion 51 having the diameter reduced projects upward from the connecting member 36 and the hole 53 can communicate to a hole 54 bored from the hole 45 of the connecting member 36 diametrally to an outer peripheral surface. That is, when the valve body 50 is located in the position shown in the drawing, the hole 53 in the valve body communicates to the hole 54 in the connecting member, and when the valve body 50 is rotated 90° for example, the hole 53 is insulated from the hole 54.

The valve body is held by a cylindrical spacer 56 forced into a lower portion of the hole 45 in the connecting member, a low friction plate 58 disposed on an upper side of the valve body 50 and a holder 62 provided on the inner and outer peripheral surfaces with O-rings 60,61 and forced into the upper portion of the hole 45. The valve body 50 is connected to an actuator (not shown) through the operating portion 51 thereof so as to be rotated by the actuator. The actuator is supported by a bracket 64 connected with the piston rod 22 by the nut 48.

When the air chamber 14 is constituted to be divided into the main air chamber 15a and the auxiliary air chamber 15b, while communication between both chambers is afforded and interrupted by the valve body 50, a soft spring constant can be maintained by affording communication between both air chambers and the hard one can be maintained by interrupting such communication in travelling so that the spring constant corresponding to the travelling condition can be obtained. However, the air chamber 14 may be used without such division. In this case, the valve body 50 and the actuator disposed in the connecting member 36 can be omitted.

The rubber bushing 38 is vulcanized and bonded to inner and outer tubes 66,68. The load from the piston rod 22 is applied to the rubber bushing 38. However, since this load is generally small, the rubber bushing 38 can be formed as soft as possible.

In the inner tube 66 mounting an O-ring 70 is fitted the connecting member 36 which is caulked to connect the connecting member 36 with the inner tube 66. The inner tube 66 has an annular groove 72 provided at a position on the inner peripheral surface opposed to the hole 54 in the connecting member 36 and a hole 73 extending from the groove 72 to the outer peripheral surface, and the rubber bushing 38 has a hole 74 communicating to the hole 73 in the inner tube 66.

The outer tube 68 on which is mounted an O-ring 76 is fitted in the cylindrical member 40 which is caulked to connect the outer tube 68 with the cylindrical member 40. The outer tube 68 has a hole 78 communicating to the hole 74 in the rubber bushing 38 and the cylindrical member 40 has a hole 79 communicating to the hole 78 in the outer tube 68. The path formed of said various holes in the support 34 communicates to the auxiliary air chamber 15b on the one hand and to a space 80 surrounded by the cylindrical member 40 on the other hand. The space 80 communicates to the main air chamber 15a through a gap 81 and a path 83 provided in a bound stopper 82.

Figure 2:
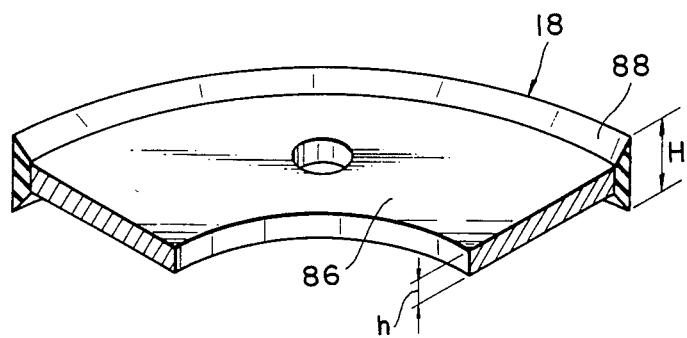
FIG. 2 is a perspective view showing a part of a spacer.

As shown in FIG. 2, the spacer 18 consists of a metal base 86 formed annularly as a whole and a seal member 88 made of rubber or resin. In the embodiment shown, the seal member 88 formed annularly of rubber is vulcanized and bonded to the outer perpheral surface of the base 86. The axial thickness H of the seal member 88 is larger than the thickness h of the base 86 to provide an interference. This spacer 18 is disposed between the housing 16 and the car body 30.

In the embodiment shown, a means 90 for securing the housing 16 to the car body 30 is a bolt 92 and nut 94. A plurality of bolts 92 are welded in an airtight manner to the top 27a of the first member 26 of the housing 16 at circumferential intervals. After the spacer 18 is disposed, these bolts 92 are extended through holes of the spacer and the car body 30 and the nuts 94 are screwed onto the bolts 92 to secure the housing 16 fixedly to the car body 30.

Figure 3:
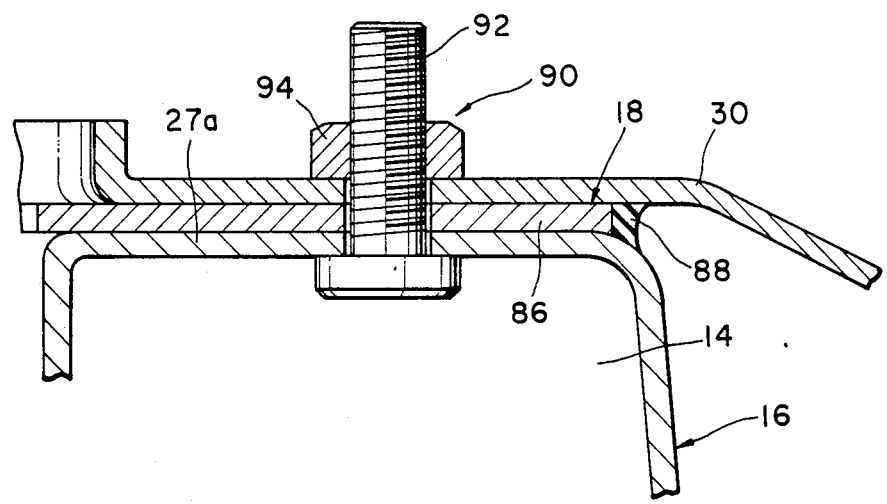
FIG. 3 is an enlarged sectional view showing a part of the housing mounting condition.

The size of a gap between the housing 16 and the car body 30 is determined by the thickness h of the base 86 of the spacer 18 as shown in FIG. 3. When this thickness is increased, the housing 16 moves downward to change the volume of the air chamber 14 even if the height of the car body 30 is constant. As a result, the spring constant of the air spring can be changed. Then, various spacers having different thicknesses of the base 86 are prepared to use larger thickness for a sport type of automobile for example.

Obviously, numerous modifications and variations of the present invention are possible in light of the above teachings. It is therefore to be understood that within the scope of the appended claims, the invention may be practiced otherwise than as specifically described herein.

What is claimed is:

1. An air suspension assembly provided with an air chamber for an air spring positioned below a car body surrounding a shock absorber, comprising:
    a piston rod;
    a housing for forming said air chamber having a support including a connecting member connected with said piston rod and a resilient bushing disposed outside the connecting member;
    a spacer disposed radially outwardly of said support between said housing and the car body; and
    means for securing said housing to the car body and for transmitting a majority of a force from the air spring directly to the car body.

2. An air suspension assembly as claimed in claim 1, wherein said spacer comprises an annular base member and a seal member fixed to the base member and contacting said housing and the car body respectively.

3. An air suspension assembly as claimed in claim 2, wherein said seal member has an axial thickness larger than that of the base member before disposal of the spacer.

4. An air suspension assembly provided with an air chamber for an air spring positioned below a car body surrounding a shock absorber, the air chamber including a main air chamber and an auxiliary air chamber, comprising:

a piston rod;

a housing for forming said air chamber having a support including a connecting member connected with said piston rod and a rubber bushing disposed outside the connecting member;

a spacer disposed radially outwardly of said support between said housing and the car body;

means for securing said housing to the car body and for transmitting a majority of a force from the air spring directly to the car body; and a valve disposed in said connecting member of the support and affording and interrupting communication between said main and auxiliary chambers.

5. An air suspension assembly provided with an air chamber for an air spring positioned below a car body surrounding a shock absorber, comprising:

a piston rod;

a housing for forming said air chamber having a support including a connecting member connected with said piston rod and a resilient bushing disposed outside the connecting member;

a spacer disposed radially outwardly of said support between said housing and the car body and which comprises an annular base member and a seal member fixed to the base member, said seal member having an axial thickness larger than that of the base member before disposal of the spacer; and means for securing said housing to the car body, and for transmitting a majority of a force from the air spring directly to the car body.

* * * * *